United States Patent Office 2,936,415
Patented May 10, 1960

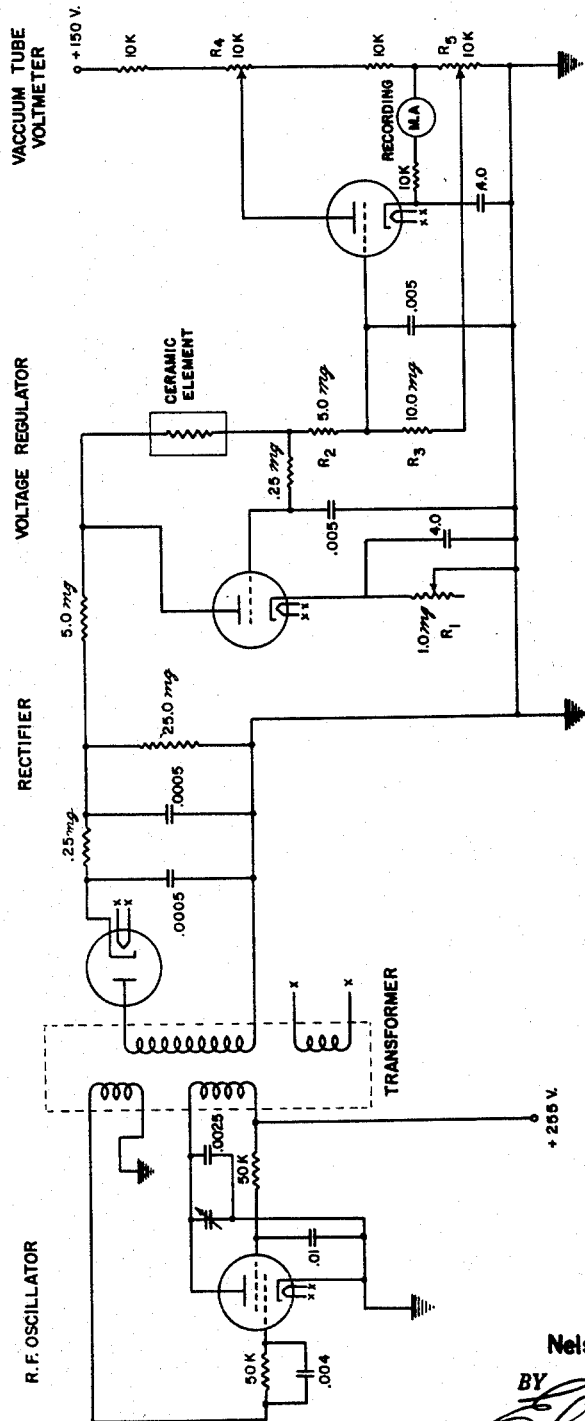

2,936,415

MEASUREMENT AND RECORDING OF CHANGES IN ELECTRICAL RESISTANCE OVER A VERY WIDE RANGE OF RESISTANCE VALUES AS APPLIED TO THE MEASUREMENT OF RELATIVE HUMIDITY THROUGH THE USE OF A CERAMIC SENSING ELEMENT

Nelson E. Alexander, Frederick, Md., assignor to the United States of America as represented by the Secretary of the Army Application May 15, 1957, Serial No. 659,441

2 Claims. (Cl. 324—62)

(Granted under Title 35, U.S. Code (1952), sec. 266)

The invention described herein may be manufactured and used by or for the Government of the United States of America for governmental purposes without the payment to me of any royalty thereon.

This invention refers to an apparatus for determining the resistance of an element. More particularly, it refers to an apparatus for measuring the resistance of a ceramic element under varying degrees of humidity.

The principle of using the resistance of an unglazed ceramic element as an indicator of humidity is old. Such an element has a resistance under low humidity conditions that may rise several hundred megohms. Conversely, under saturated conditions this value may fall to a few hundred ohms. In order that such high values may be measured accurately, high potentials are necessary. Conversely, when the resistance falls due to increased humidity a lower potential is required in order that the meter used shall not go off scale.

The present invention is directed to a circuit for supplying and controlling such variable potential and to a means for measuring the potential drop across and therefore the resistance of the ceramic element.

In the drawing, the various components of the circuit are labeled and operating voltages are shown. The R.F. oscillator is conventional using a 6V6 tube and feeds into a transformer which serves to raise the voltage to the desired value. The transformer used in this circuit was a Stanwyck Winding Co. S-930 R.F. transformer, although any transformer of suitable characteristics may be used.

The secondary voltage from this transformer is fed into a single ended rectifier. Following the rectifier is a smoothing filter, which in turn is followed by a 25.0 mg. bleeding resistor to ground and a 5.0 mg. load resistor, after which there appears a voltage regulator, the ceramic element and a vacuum tube voltmeter. The purpose of the voltage regulator is to control the voltage applied to the grid of the V.T.V.M. within the range of a few volts while at the same time it regulates the voltage applied to the humidity sensitive ceramic element from values of 4 or 5 thousand volts to less than 100 volts.

The regulator tube which is a high mu triode, performs these functions by means of plate current and grid current variation. When the resistance of the ceramic element is very high, the plate current is cut off by the grid and the voltage is maximum at the ceramic element. As the resistance of this element decreases, more plate current is permitted to flow, thereby lowering the voltage impressed on the element due to the voltage drop across the 5 meg. series resistor $R_2$ and compressing the voltage change at the grid of the vacuum tube voltmeter. With further decrease in resistance of the element, maximum plate current is drawn. With still further decrease in resistance, the grid draws increasing current to compress the voltage drop across the 10 meg. grid resistor $R_3$ of the vacuum tube voltmeter. The 5.0 mg load resistor serves to make the voltage regulator effective in controlling the voltage across the ceramic element.

The combined action of plate current and grid current through the regulator tube holds the voltage changes at the grid of the vacuum tube voltmeter within the meter's operating limits so that changes in resistance of the element from several hundred ohms to hundreds of millions of ohms can be measured and recorded.

To prepare the instrument for use, it must be standardized and the meter calibrated preferably in terms of relative humidity. In carrying this out, the ceramic element is first removed to introduce the equivalent of an infinite resistance into the circuit. Potentiometer $R_5$ is then adjusted for zero reading of the meter. The element terminals are then shorted and potentiometer $R_4$ is adjusted for maximum scale reading. Following this, the ceramic element is introduced into the circuit and a series of known relative humidities are prepared in sealed jars by means of salts having known values of vapor pressure. Salts are chosen which give selected readings substantially across the entire meter scale.

Starting with an atmosphere having an extremely low known relative humidity, the element is exposed to this atmosphere and the cathode resistor $R_1$ of the voltage regulator tube is adjusted to give a meter reading close to the zero mark on the meter scale. It is important that the first prepared atmosphere used for standardizing the instrument shall have a lower relative humidity than any that the apparatus will henceforth be called upon to measure. The element is subsequently exposed to the series of prepared atmospheres of known relative humidities and the meter scale calibrated in each instance. Having completed the calibrations, the instrument is ready for use and $R_1$ is not further disturbed as long as the same ceramic element remains in the circuit. The meter should be checked for zero and full scale readings each time it is used by opening and shorting the terminals at the ceramic element and adjusting $R_5$ and $R_4$ respectively.

It is to be understood that the high voltage supply may have many variants apart from the modification shown.

I claim:

1. An instrument for measuring the value of a variable resistor comprising a direct current voltage supply, a series load resistor in said voltage supply followed by said variable resistor, a triode vacuum tube voltage regulator in parallel with said variable resistor, the cathode of said voltage regulator being connected to ground through a resistor, the plate of said voltage regulator being connected to the junction of the load resistor and one end of the variable resistor, the grid of said voltage regulator being grounded through a capacitor and connected through a resistor to the other end of said variable resistor to supply its bias, said other end of said variable resistor being connected to ground through a third resistor and a voltage divider, a vacuum tube voltmeter comprising a single triode and having a control grid connected to a source of positive bias represented by an intermediate point of said third resistor, said vacuum tube voltmeter having its plate connected to a source of voltage represented by the positive end of said voltage divider and having a cathode connected to ground through a milliammeter near the ground terminal of said voltage divider, said voltage regulator serving to automatically control the voltage applied to the variable resistor in direct proportion to the resistance of said variable resistor.

2. An instrument in accordance with claim 1 wherein the direct current voltage supply comprises a transformer, an R.F. oscillator as the primary of said transformer, a diode rectifier in the secondary of said transformer and a resistance capacitance filter following said diode rectifier.

References Cited in the file of this patent

UNITED STATES PATENTS

| | | |
|---|---|---|
| 2,086,965 | Shepard | July 13, 1937 |
| 2,272,239 | Delmhorst | Feb. 10, 1942 |
| 2,871,446 | Wann | Jan. 27, 1959 |

UNITED STATES PATENT OFFICE

CERTIFICATE OF CORRECTION

Patent No. 2,936,415            May 10, 1960

Nelson E. Alexander

It is hereby certified that error appears in the above numbered patent requiring correction and that the said Letters Patent should read as corrected below.

In the grant, lines 1, 2 and 3, for "Nelson E. Alexander, of Frederick, Maryland, assignor to the United States of America as represented by the Secretary of the Army," read -- Nelson E. Alexander, of Frederick, Maryland, --; lines 12 and 13, for "United States of America as represented by the Secretary of the Army" read -- Nelson E. Alexander, his heirs or assigns --; in the heading to the printed specification, lines 8, 9 and 10, for "Nelson E. Alexander, Frederick, Md., assignor to the United States of America as represented by the Secretary of the Army" read -- Nelson E. Alexander, Frederick, Md. --.

Signed and sealed this 18th day of October 1960.

(SEAL)
Attest:

KARL H. AXLINE
Attesting Officer

ROBERT C. WATSON
Commissioner of Patents